(12) United States Patent
Ochiai et al.

(10) Patent No.: US 10,609,243 B2
(45) Date of Patent: Mar. 31, 2020

(54) IMAGE CAPTURING APPARATUS, IMAGE CAPTURING SYSTEM, AND MOVABLE APPARATUS

(71) Applicant: CANON KABUSHIKI KAISHA, Tokyo (JP)

(72) Inventors: Kei Ochiai, Inagi (JP); Takahiro Shirai, Isehara (JP); Tetsuya Itano, Sagamihara (JP); Yasushi Iwakura, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 15/711,105

(22) Filed: Sep. 21, 2017

(65) Prior Publication Data
US 2018/0097960 A1   Apr. 5, 2018

(30) Foreign Application Priority Data

Sep. 30, 2016 (JP) ................. 2016-194774

(51) Int. Cl.
| | |
|---|---|
| *H04N 1/00* | (2006.01) |
| *H04N 5/357* | (2011.01) |
| *H04N 5/374* | (2011.01) |
| *G01K 7/01* | (2006.01) |

(Continued)

(52) U.S. Cl.
CPC ........... *H04N 1/00978* (2013.01); *G01K 7/01* (2013.01); *H04N 5/357* (2013.01); *H04N 5/3572* (2013.01); *H04N 5/3575* (2013.01); *H04N 5/365* (2013.01); *H04N 5/374* (2013.01); *H04N 5/3765* (2013.01)

(58) Field of Classification Search
CPC .... H04N 5/357; H04N 5/3572; H04N 5/3575; H04N 5/365; H04N 5/374; H04N 5/3765; H04N 1/00978; G01K 7/01
See application file for complete search history.

(56) References Cited

U.S. PATENT DOCUMENTS

| | | | |
|---|---|---|---|
| 7,225,099 B1 | 5/2007 | O'Dwyer | |
| 7,648,271 B2 * | 1/2010 | Doorenbos | .............. G01K 7/01 327/512 |
| 7,741,593 B2 | 6/2010 | Iwata et al. | |

(Continued)

FOREIGN PATENT DOCUMENTS

| | | |
|---|---|---|
| DE | 10-2004-013269 A1 | 9/2005 |
| JP | H07-007667 A | 1/1995 |

(Continued)

OTHER PUBLICATIONS

Search Report dated Jul. 11, 2018, in European Patent Application No. 17191219.9.

(Continued)

*Primary Examiner* — Nhan T Tran
*Assistant Examiner* — Chriss S Yoder, III
(74) *Attorney, Agent, or Firm* — Venable LLP

(57) ABSTRACT

An image capturing apparatus includes a plurality of pixels arranged on a substrate, a temperature signal output unit arranged on the substrate and configured to output a temperature signal representing a temperature, and a reference signal output unit arranged on the substrate and configured to output a reference signal used to correct the temperature signal. The temperature signal output unit and the reference signal output unit are arranged in regions different from each other on the substrate.

31 Claims, 9 Drawing Sheets

(51) Int. Cl.
*H04N 5/365* (2011.01)
*H04N 5/376* (2011.01)

(56) References Cited

U.S. PATENT DOCUMENTS

| | | |
|---|---|---|
| 8,289,431 B2 | 10/2012 | Itano |
| 8,400,546 B2 | 3/2013 | Itano et al. |
| 8,928,786 B2 | 1/2015 | Iwata et al. |
| 9,083,906 B2 | 7/2015 | Nakamura et al. |
| 9,154,718 B2 | 10/2015 | Sato et al. |
| 2007/0273775 A1 | 11/2007 | Jiang |
| 2011/0205071 A1* | 8/2011 | Namekawa ............... G01K 7/42 340/588 |
| 2012/0194718 A1* | 8/2012 | Sato ....................... H04N 5/357 348/301 |
| 2013/0049777 A1 | 2/2013 | Wang et al. |
| 2017/0257605 A1 | 9/2017 | Iwakura et al. |

FOREIGN PATENT DOCUMENTS

| | | |
|---|---|---|
| JP | 2007-329655 A | 12/2007 |
| JP | 2008-039451 A | 2/2008 |
| JP | 2012-151664 A | 8/2012 |
| JP | 2016-009880 A | 1/2016 |

OTHER PUBLICATIONS

Search Report dated Mar. 12, 2018, in European Patent Application No. 17191219.9.

\* cited by examiner

IMAGE CAPTURING APPARATUS, IMAGE CAPTURING SYSTEM, AND MOVABLE APPARATUS

BACKGROUND OF THE INVENTION

Field of the Invention

The present invention relates to an image capturing apparatus, an image capturing system, and a movable apparatus.

Description of the Related Art

Japanese Patent Laid-Open No. 2012-151664 describes mounting a pixel array portion and a diode serving as a temperature sensor and obtaining a temperature measurement value based on the difference of a diode voltage generated when a diode current is changed, thereby improving the accuracy of temperature measurement.

According to the invention described in Japanese Patent Laid-Open No. 2012-151664, a measurement error that occurs because the current-voltage characteristic of the diode cannot be expressed as a linear approximation is reduced. In the invention described in Japanese Patent Laid-Open No. 2012-151664, however, a deviation of an obtained temperature value from a true value, which occurs due to a variation between elements or signals in the apparatus caused by a manufacturing error or the like, is not taken into consideration. To more correctly detect the temperature, a technique for reducing the influence of an error caused by a manufacturing error or the like is necessary.

SUMMARY OF THE INVENTION

The present invention provides a technique advantageous in more accurately detecting a temperature.

One of aspects of the present invention provides an image capturing apparatus comprising: a plurality of pixels arranged on a substrate; a temperature signal output unit arranged on the substrate and configured to output a temperature signal representing a temperature; and a reference signal output unit arranged on the substrate and configured to output a reference signal used to correct the temperature signal, wherein the temperature signal output unit and the reference signal output unit are arranged in regions different from each other on the substrate.

Further features of the present invention will become apparent from the following description of exemplary embodiments with reference to the attached drawings.

DESCRIPTION OF THE EMBODIMENTS

The present invention will now be described with reference to the accompanying drawings by way of exemplary embodiments.

Figure 1:
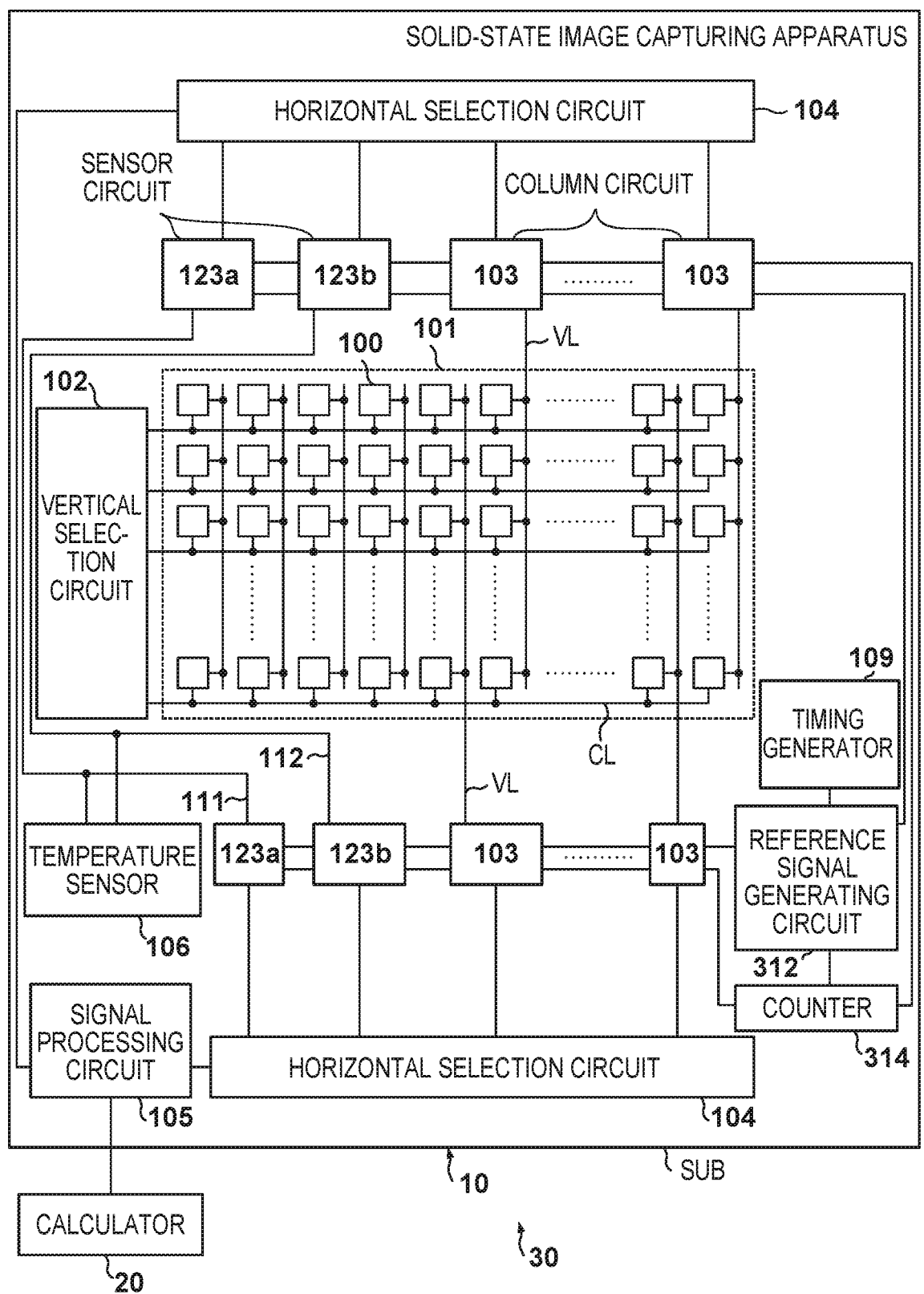
FIG. 1 is a block diagram showing the arrangement of an image capturing apparatus and an image capturing system according to the first embodiment.

FIG. 1 shows the arrangement of an image capturing apparatus 10 and an image capturing system 30 according to the first embodiment of the present invention. The image capturing system 30 can include the image capturing apparatus 10 and a calculator 20. The image capturing apparatus 10 can be configured to capture an image and also output a temperature signal representing a temperature and a reference signal used to correct the temperature signal. The calculator 20 can be configured to obtain a corrected temperature by correcting the temperature signal based on the reference signal.

The image capturing apparatus 10 can output the temperature signal and the reference signal using either an analog signal format or a digital signal format. An example in which the image capturing apparatus 10 outputs the temperature signal and the reference signal using a digital signal format will be described below. Note that the first embodiment uses the terms "image capturing apparatus" and "image capturing system" while distinguishing one from the other. However, these expressions are used merely for the sake of convenience with focus on the presence/absence of the calculator. The image capturing system 30 in the first embodiment may be called an image capturing apparatus.

The image capturing apparatus 10 can include a pixel array 101, a vertical selection circuit 102, a plurality of column circuits 103, sensor circuits 123a and 123b, horizontal selection circuits 104, a signal processing circuit 105, a temperature sensor 106, a reference signal generating circuit 312, and a counter 314. The image capturing apparatus 10 can also include a timing generator 109. The timing generator 109 generates various kinds of signals to control timings, as will be described later. The pixel array 101, the vertical selection circuit 102, the column circuits 103, the sensor circuits 123a and 123b, the horizontal selection circuits 104, the signal processing circuit 105, the temperature sensor 106, the reference signal generating circuit 312, the counter 314, and the timing generator 109 can be arranged on one substrate SUB. The one substrate SUB is, for example, a semiconductor chip separated from a semiconductor wafer by dicing.

The pixel array 101 includes a plurality of pixels 100 that are arranged to form a plurality of rows and a plurality of columns. The pixels 100 arranged on the same row are controlled by a control signal supplied from the vertical selection circuit 102 via a common control line CL. The pixels 100 arranged on the same column are connected to a common signal line VL. Although not illustrated, the signal line VL can be connected to a current source. Each pixel 100 outputs, for example, a noise signal N or an optical signal S to the signal line VL. Each signal line VL can be connected to one column circuit 103.

In the example shown in FIG. 1, the signal lines VL connected to the pixels 100 that form odd-numbered columns are connected to the column circuits 103 arranged on one side of the pixel array 101. In addition, the signal lines VL connected to the pixels 100 that form even-numbered columns are connected to the column circuits 103 arranged on the other side of the pixel array 101. However, this is merely an example, and all signal lines VL may be connected to the column circuits 103 arranged on one side of the pixel array 101.

Each column circuit 103 converts the analog signals of the noise signal and the optical signal output from the pixel 100 into a noise signal and an optical signal in a digital format. Each of the plurality of column circuits 103 outputs a set of a noise signal and an optical signal. Each horizontal selection circuit 104 sequentially selects one set from a plurality of sets and supplies the noise signal and the optical signal of the selected set to the signal processing circuit 105.

The temperature sensor 106 can be configured to output a temperature signal and a reference signal when a current of a first current value is supplied to a temperature detection element to be described later and also output a temperature signal and a reference signal when a current of a second current value is supplied to the temperature detection element. The sensor circuit 123a converts a temperature signal into a temperature signal in a digital format. The sensor circuit 123b converts a reference signal into a reference signal in a digital format. The sensor circuits 123a and 123b can have the same arrangement as the column circuit 103.

The signal processing circuit 105 can be configured to generate a pixel signal by calculating the difference between the noise signal and the optical signal in the digital format. The signal processing circuit 105 can also be configured to obtain a corrected temperature by correcting the temperature signal in the digital format based on the reference signal in the digital format. In the example shown in FIG. 1, the temperature sensor 106 is connected to one horizontal selection circuit 104 via the sensor circuits 123a and 123b and also connected to the other horizontal selection circuit 104 via the other sensor circuits 123a and 123b. However, this is merely an example, and the temperature sensor 106 may be connected to only one horizontal selection circuit 104 via the sensor circuits 123a and 123b.

In the example shown in FIG. 1, the pixel array 101 includes the pixels 100 that are not connected to the column circuits 103. However, this is merely an example, and an arrangement in which all pixels 100 are connected to the column circuits 103 may be employed. The pixels 100 that are not connected to the column circuits 103 may be connected to the current source (not shown).

Figure 2:
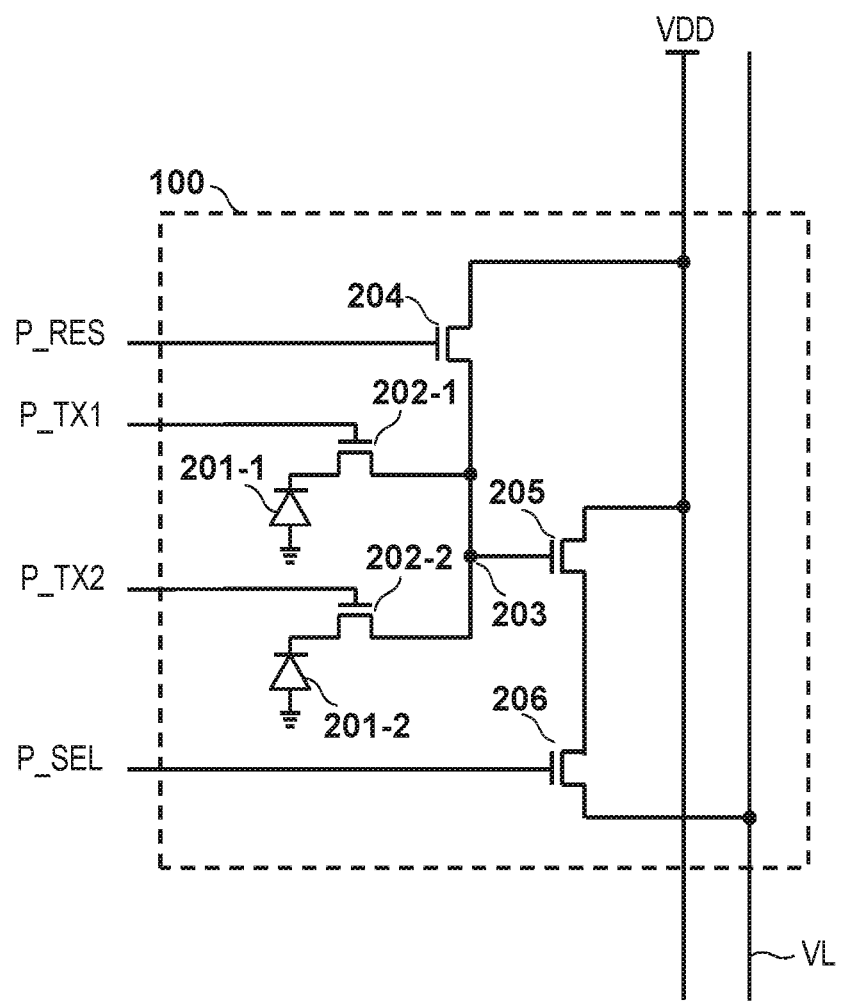
FIG. 2 is a circuit diagram showing an example of the arrangement of a pixel.

FIG. 2 shows an example of the arrangement of the pixel 100. Control signals P_RES, P_TX1, P_TX2, and P_SEL are control signals supplied to the pixel 100 via the control line CL described above. One pixel 100 shown in FIG. 2 includes two photoelectric converters 201-1 and 201-2. Although not illustrated, the one pixel 100 can include one microlens shared by the two photoelectric converters 201-1 and 201-2. The two photoelectric converters 201-1 and 201-2 can be, for example, photodiodes.

The pixel 100 can include a charge-voltage converter 203 (floating diffusion) and transfer MOS transistors 202-1 and 202-2. The transfer MOS transistor 202-1 transfers charge in the photoelectric converter 201-1 to the charge-voltage converter 203 when the transfer control signal P_TX1 is activated. The transfer MOS transistor 202-2 transfers charge in the photoelectric converter 201-2 to the charge-voltage converter 203 when the transfer control signal P_TX2 is activated. The charge-voltage converter 203 is formed by a capacitor and converts charge (charge amount) into a voltage.

The pixel 100 can also include a reset MOS transistor 204, an amplification MOS transistor 205, and a select MOS transistor 206. The reset MOS transistor 204 resets the charge-voltage converter 203 to a reset voltage when the reset control signal P_RES is activated. The amplification MOS transistor 205 forms a source follower circuit together with the current source (not shown) connected to the signal line VL, and outputs a signal corresponding to the voltage of the charge-voltage converter 203 to the signal line VL. In other words, a signal corresponding to the charge (charge amount) transferred to the charge-voltage converter 203 is output to the signal line VL. The select MOS transistor 206 connects the amplification MOS transistor 205 to the signal line VL when the select control signal P_SEL is activated. That the select control signal P_SEL is selected means that the pixels 100 of the row to which the select control signal P_SEL is supplied are selected.

The arrangement of the pixel 100 is not limited to the above-described example. For example, one pixel 100 may be formed by one photoelectric converter, one charge-voltage converter, one reset MOS transistor, one transfer MOS transistor, one amplification MOS transistor, and one select MOS transistor. In a method of selecting the pixel 100 by controlling the reset voltage of the charge-voltage converter 203, the select MOS transistor 206 is not necessary.

In the above example, the image capturing apparatus 10 is constructed in a form of a MOS image sensor. However, the image capturing apparatus 10 may be constructed in another form such as a CCD image sensor.

Figure 3:
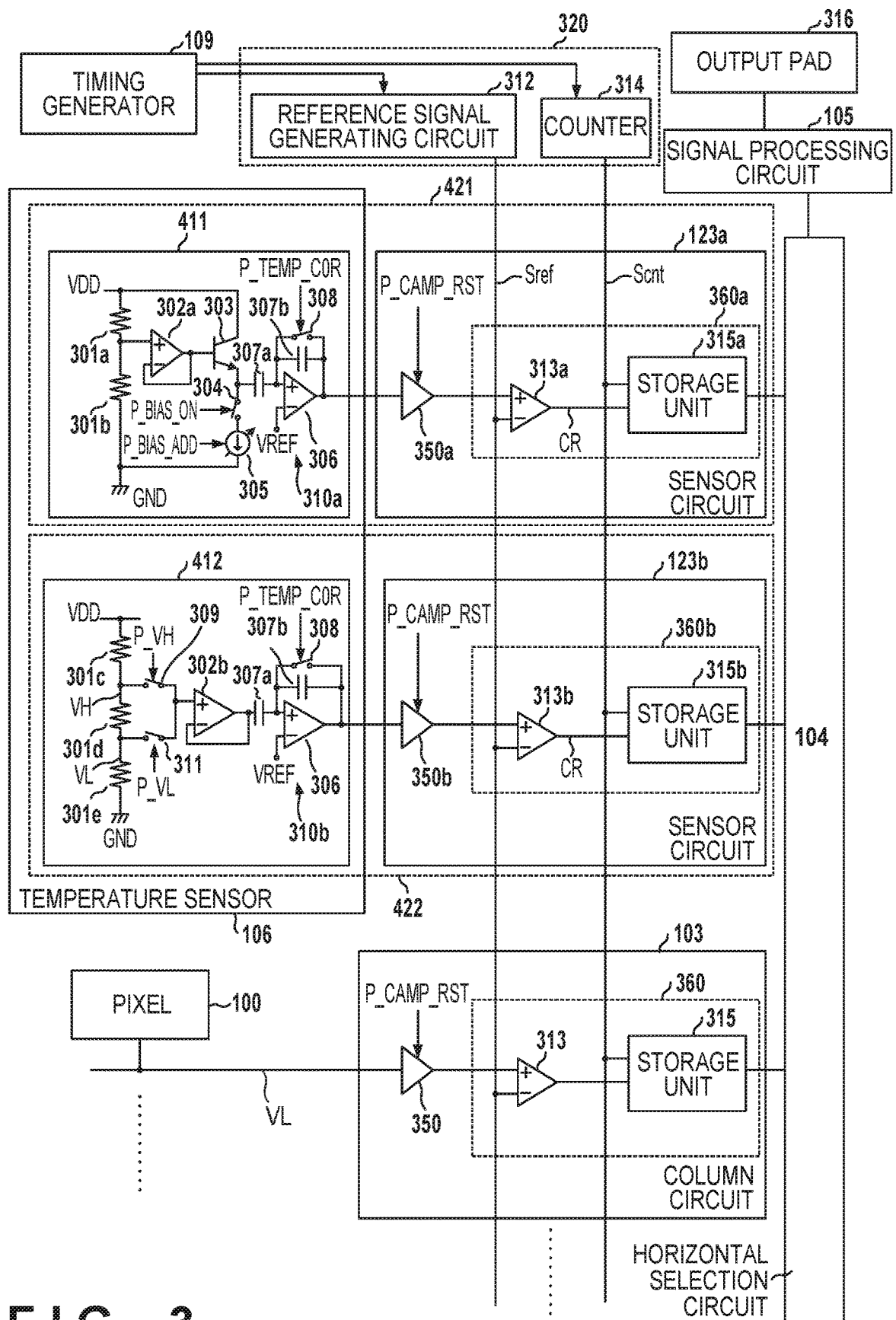
FIG. 3 is a block diagram showing an example of implementation of a part of the image capturing apparatus.

FIG. 3 shows an example of implementation of a part of the image capturing apparatus 10 shown in FIG. 1. The temperature sensor 106 includes a temperature signal generator 411 and a reference signal generator 412. The temperature signal generator 411 and the reference signal generator 412 can be arranged in regions different from each other on the substrate SUB. The temperature signal generator 411 generates a temperature signal representing a temperature. The reference signal generator 412 generates a reference signal used to correct the temperature signal. The temperature signal generated by the temperature signal generator 411 is supplied to the sensor circuit 123a. The reference signal generated by the reference signal generator 412 is supplied to the sensor circuit 123b. The temperature signal generator 411 and the sensor circuit 123a form a temperature signal output unit 421 that outputs the temperature signal. The reference signal generator 412 and the sensor circuit 123b form a reference signal output unit 422 that outputs the reference signal. The signal line VL connected to the pixel 100 is connected to the column circuit 103.

When manufacturing a plurality of image capturing apparatuses 10 from a semiconductor wafer, the characteristic of a circuit in a path to generate a temperature signal and output it or a circuit that supplies a signal to the circuit in the path changes between the image capturing apparatuses 10. This is because an error that occurs at the time of manufacturing can change for each semiconductor wafer, or even on the same wafer, and an error that occurs at the time of manufacturing can change if the locations of elements to be manufactured are far apart. The circuit is, for example, the temperature signal output unit 421, the sensor circuit 123a, the reference signal generating circuit 312, or the counter 314.

In the first embodiment, the reference signal output unit 422 that outputs the reference signal used to correct the temperature signal output from the temperature signal output unit 421 is arranged on the same substrate SUB as the temperature signal output unit 421. The temperature dependency of the reference signal output from the reference signal output unit 422 is lower than the temperature dependency of the temperature signal output from the temperature signal output unit 421. The temperature signal output unit 421 and the reference signal output unit 422 which are arranged on the same substrate SUB can have the same manufacturing error (for example, the line width error of the pattern). Hence, the reference signal output unit 422 includes an element having mutuality with an element that causes the error of the temperature signal output from the temperature signal output unit 421. For this reason, the temperature signal output from the temperature signal output unit 421 can be corrected based on the reference signal output from the reference signal output unit 422. A temperature (corrected temperature) whose error is reduced or removed can thus be obtained.

A first temperature signal (analog temperature signal) output from the temperature signal generator 411 is supplied to the sensor circuit 123a. The sensor circuit 123a A/D-converts the first temperature signal supplied from the temperature signal generator 411 and outputs a digital signal corresponding to the first temperature signal as a temperature signal (digital temperature signal). Here, the temperature signal output from the temperature signal generator 411 is expressed as the first temperature signal. This is a convenient expression in order to make a distinction between the signal and the temperature signal (digital temperature signal) output from the temperature signal output unit 421 (sensor circuit 123a). Both the signal output from the temperature signal generator 411 and the signal output from the temperature signal output unit 421 (sensor circuit 123a) are temperature signals.

The sensor circuit 123a can include a first amplifier 350a that amplifies the first temperature signal output from the temperature signal generator 411. However, the first amplifier 350a may be absent. The sensor circuit 123a can include a first A/D converter 360a that converts the first temperature signal output from the temperature signal generator 411 via the first amplifier 350a into a digital signal, thereby generating a digital temperature signal. The first amplifier 350a is, for example, an amplifier having a variable gain. If the first amplifier 350a is absent, the temperature signal output from the temperature signal generator 411 can be input to the first A/D converter 360a.

The first A/D converter 360a compares the amplified first temperature signal (analog signal) supplied from the first amplifier 350a with a reference signal Sref supplied from the reference signal generating circuit 312. The first A/D converter 360a decides, as a digital signal, a count value representing a time from the start of the comparison until inversion of the result of the comparison. A count value signal Scnt that provides the count value is supplied from the counter 314. The counter 314 can be controlled by the timing generator 109 so as to start a count operation (time count operation) in accordance with the start of comparison.

The first A/D converter 360a includes, for example, a comparator 313a and a storage unit 315a. The comparator 313a compares the amplified first temperature signal (analog signal) supplied from the first amplifier 350a with the reference signal Sref supplied from the reference signal generating circuit 312, and outputs a comparison result signal CR representing the comparison result. The comparison result signal CR can be, for example, a signal to be activated for a predetermined period when the comparison result is inverted. The storage unit 315a receives and holds the count value of the count value signal Scnt when the comparison result signal CR is activated. The count value is the value of the digital temperature signal corresponding to the amplified first temperature signal (analog signal) supplied from the first amplifier 350a.

A first reference signal (analog reference signal) output from the reference signal generator 412 is supplied to the sensor circuit 123b. The sensor circuit 123b can have the same arrangement as the sensor circuit 123a. The sensor circuit 123b A/D-converts the first reference signal supplied from the reference signal generator 412 and outputs a digital signal corresponding to the first reference signal as a reference signal (digital reference signal). Here, the reference signal output from the reference signal generator 412 is expressed as the first reference signal. This is a convenient expression in order to make a distinction between the signal and the reference signal (digital reference signal) output from the reference signal output unit 422 (sensor circuit 123b). Both the signal output from the reference signal generator 412 and the signal output from the reference signal output unit 422 (sensor circuit 123b) are reference signals.

The sensor circuit 123b can include a second amplifier 350b that amplifies the first reference signal output from the reference signal generator 412. However, the second amplifier 350b may be absent. The sensor circuit 123b can include a second A/D converter 360b that converts the first reference signal output from the reference signal generator 412 via the second amplifier 350b into a digital signal, thereby generating a digital reference signal. The second amplifier 350b is, for example, an amplifier having a variable gain. If the second amplifier 350b is absent, the reference signal output from the reference signal generator 412 can be input to the second A/D converter 360b.

The second A/D converter 360b compares the amplified first reference signal (analog signal) supplied from the second amplifier 350b with the reference signal Sref supplied from the reference signal generating circuit 312. The second A/D converter 360b decides, as a digital signal, a count value representing a time from the start of the comparison up to inversion of the result of the comparison. The count value signal Scnt that provides the count value is supplied from the counter 314.

As described above, the common reference signal Sref and count value signal Scnt can be supplied to the first A/D converter 360a and the second A/D converter 360b as signals (common signals) commonly used for A/D conversion. Here, only one of the reference signal Sref and the count value signal Scnt may be supplied as a common signal to the first A/D converter 360a and the second A/D converter 360b, and the other may be generated individually for the first A/D converter 360a and the second A/D converter 360b. That is, at least one of the reference signal Sref and the count value signal Scnt can be supplied as a common signal to the first A/D converter 360a and the second A/D converter 360b. In addition, a reset signal P_CAMP_RST used to reset the first amplifier 350a and the second amplifier 350b can be supplied as a common signal from the timing generator 109 to the first amplifier 350a and the second amplifier 350b. In the example shown in FIG. 3, the reference signal generating circuit 312 and the counter 314 form a signal generator 320 that generates the common signals.

The column circuit 103 that processes a signal supplied from the pixel 100 via the signal line VL can have the same arrangement as the sensor circuits 123a and 123b. The column circuit 103 can include a column amplifier 350 that amplifies the signal output from the pixel 100 of a selected row to the signal line VL. However, the column amplifier 350 may be absent. The column amplifier 350 is, for example, an amplifier having a variable gain. The column circuit 103 can include an A/D converter 360 that converts the signal supplied from the pixel 100 via the column amplifier 350 into a digital signal. If the column amplifier 350 is absent, the signal output from the pixel 100 can be input to the A/D converter 360.

The horizontal selection circuit 104 can be configured to read signals from the storage unit 315a of the sensor circuit 123a, a storage unit 315b of the sensor circuit 123b, and storage units 315 of the plurality of column circuits 103 in a predetermined order and supply the signals to the signal processing circuit 105. The horizontal selection circuit 104 can include a scanning circuit configured to decide which one of the storage unit 315a of the sensor circuit 123a, the storage unit 315b of the sensor circuit 123b, and the storage units 315 of the plurality of column circuits 103 should be selected. The horizontal selection circuit 104 can also include a multiplexer that can be formed by a plurality of switches controlled by the scanning circuit.

The signal processing circuit 105 processes a signal supplied from the horizontal selection circuit 104 and outputs a signal obtained by the processing to an output pad 316. The output pad 316 can be connected, by a bonding wire or the like, to a pin provided on a package that seals the substrate SUB.

The reference signal generating circuit 312 includes, for example, a capacitor element and can generate the reference signal Sref by charging/discharging the capacitor element. The capacitance value of the capacitor element can vary between the image capturing apparatuses 10 due to the manufacturing process. The delay time of the count value signal Scnt can also vary between the image capturing apparatuses 10. If the reference signal Sref and/or the count value signal Scnt varies between the image capturing apparatuses 10, the temperature signal can vary between the image capturing apparatuses 10 even for the same temperature. In other words, the temperature signal can include an error caused by the manufacturing process.

The image capturing apparatus 10 includes the reference signal output unit 422 that outputs the reference signal used to correct the temperature signal. The temperature dependency of the reference signal output from the reference signal output unit 422 is lower than the temperature dependency of the temperature signal output from the temperature signal output unit 421. Hence, using the difference in the temperature dependency, a corrected temperature can be obtained by correcting the temperature signal using the reference signal.

To improve the correction accuracy, the sensor circuit 123a configured to output the temperature signal and the sensor circuit 123b configured to output the reference signal preferably have the same arrangement. In addition, the common signals (the reference signal Sref and the count value signal Scnt) are preferably supplied to the sensor circuits 123a and 123b. Accordingly, if error factors exist in the signal processes of the sensor circuits 123a and 123b, the error factors can be made equal to each other.

Let G1 be the conversion gain of the sensor circuit 123a, and G2, the conversion gain of the sensor circuit 123b. Each conversion gain includes an amplification gain $G_{am}$ of the amplifiers 350a and 350b and an A/D conversion gain $G_{AD}$ of the A/D converters 360a and 360b. A corrected temperature can be given by (corrected temperature)=$K\times$(output of output value of temperature signal generator 411×$G1$)/(output of output value of reference signal generator 412×$G2$)     (1)

where K is typically a coefficient, which may be, for example, a function of (output of output value of temperature signal generator 411×$G1$).

That is, the corrected temperature can be obtained based on the ratio of the output value of the sensor circuit 123a to the output value of the sensor circuit 123b. G1 and G2 can be made almost equal by causing the sensor circuits 123a and 123b to have the same arrangement and using at least one or preferably both of the reference signal Sref and the count value signal Scnt as common signals. Accordingly, the error factor in the sensor circuit 123a can be canceled or reduced by the error factor in the sensor circuit 123b. K in equation (1) can be decided based on the relationship between the actual temperature and (output of output value of temperature signal generator 411×G1)/(output of output value of reference signal generator 412×G2).

As described above, the temperature signal output unit 421 and the reference signal output unit 422 are formed on the same substrate SUB. Hence, even if the characteristic of an element varies between the image capturing apparatuses 10 due to a manufacturing error, the difference in characteristic is small between elements having identical or similar arrangements in the temperature signal output unit 421 and the reference signal output unit 422. Even if an element included in the temperature signal output unit 421 is an element that can cause a variation, correction of the temperature signal using the reference signal is enabled by forming the reference signal output unit 422 using an element with an arrangement identical or similar to the arrangement of the element.

Hence, when the ratio of the output of the temperature signal output unit 421 to the output of the reference signal output unit 422 is calculated in accordance with equation (1), variation factors in the outputs are canceled or reduced, and the accuracy of temperature measurement can be improved. If a factor that degrades the accuracy of temperature measurement is a factor that generates noise, the difference between the output of the temperature signal output unit 421 and the output of the reference signal output unit 422 is calculated, thereby removing or reducing the noise signal.

FIGS. 1 and 3 show an example in which the sensor circuits 123a and 123b are provided individually for the temperature signal generator 411 and the reference signal generator 412. However, this is merely an example, and the sensor circuits 123a and 123b may be absent, or a sensor circuit common to the temperature signal generator 411 and the reference signal generator 412 may be provided. If the sensor circuit common to the temperature signal generator 411 and the reference signal generator 412 is provided, the outputs from the temperature signal generator 411 and the reference signal generator 412 can be A/D-converted by the common sensor circuit during periods different from each other.

The temperature signal generator 411 can include, for example, resistors 301a and 301b, a first buffer circuit 302a, a temperature detection element 303, a current control switch 304, a variable current source 305, and a first amplification circuit 310a. The resistors 301a and 301b form a voltage supply circuit that divides a power supply voltage VDD to generate a predetermined voltage and supplies it to the first buffer circuit 302a. Since the predetermined voltage is decided by the ratio of the resistance values of the resistors 301a and 301b, the temperature dependency is reduced.

The first buffer circuit 302a outputs a signal according to the input voltage to the temperature detection element 303. The first buffer circuit 302a can have a high impedance. The first buffer circuit 302a can include, for example, a voltage follower circuit or a source follower circuit. FIG. 3 shows an example in which the first buffer circuit 302a is formed by a voltage follower circuit.

The temperature detection element 303 can include, for example, a bipolar transistor such as an NPN bipolar transistor. The current-voltage characteristic of the bipolar transistor has temperature dependency, and the temperature can be detected using the current-voltage characteristic. For example, the base voltage of the bipolar transistor is 2.6 V, and the emitter voltage is 3.3 V.

The current control switch 304 is a switch configured to control whether to supply a current between the emitter and the collector of the bipolar transistor serving as the temperature detection element 303. The current control switch 304 can be controlled by a current control signal P_BIAS_ON. The current control signal P_BIAS_ON can be generated by the timing generator 109. If the temperature signal output unit 421 is not used (if the temperature is not detected), the current control switch 304 is turned off to prevent image quality degradation caused by light emission of the bipolar transistor and heat generation of the bipolar transistor and also to save power.

The variable current source 305 is arranged between a ground line and the emitter of the bipolar transistor serving as the temperature detection element 303. The variable current source 305 is a current source capable of changing the value of a current (emitter current) that flows to the temperature detection element 303 (bipolar transistor), and can be controlled by a bias control signal P_BIAS_ADD. The bias control signal P_BIAS_ADD can be controlled by the timing generator 109.

The difference in the emitter voltage when the emitter current is changed is acquired, and the temperature can be detected based on the difference. According to this method, a temperature detection error derived from the nonlinear current-voltage characteristic of the bipolar transistor can be reduced. For example, in a first period, the variable current source 305 supplies a current of a first current value to the bipolar transistor serving as the temperature detection element 303. In a second period, the variable current source 305 supplies a current of a second current value different from the first current value to the bipolar transistor. Then, the temperature can be detected based on the difference between the emitter voltage in the first period and the emitter voltage in the second period. For example, the first current value is eight times larger than the second current value.

The first amplification circuit 310a can include, for example, a differential amplifier 306, an input capacitor 307a, a feedback capacitor 307b, and a reset switch 308. The input capacitor 307a can be arranged between the input terminal of the first amplification circuit 310a and the noninverting input terminal of the differential amplifier 306. A reference voltage VREF can be applied to the inverting input terminal of the differential amplifier 306. The feedback capacitor 307b and the reset switch 308 can be arranged in parallel between the noninverting input terminal of the differential amplifier 306 and the output terminal of the differential amplifier 306. The gain of the first amplification circuit 310a is decided by the ratio of the input capacitor 307a to the feedback capacitor 307b. The gain of the first amplification circuit 310a can be decided such that a voltage within the range of the level of the signal output from the pixel 100 to the signal line VL is output to the sensor circuit 123a. The arrangement of the sensor circuit 123a can thus be made equal to the arrangement of the column circuit 103. The reset switch 308 can be controlled by a reset signal P_TEMP_COR. The reset signal P_TEMP_COR can be controlled by the timing generator 109. When the reset switch 308 is turned on, the first amplification circuit 310a is reset, and a voltage equal to the reference voltage VREF is output from the first amplification circuit 310a (differential amplifier 306).

In the first period, the reset signal P_TEMP_COR is driven from an active state to an inactive state. Accordingly, the emitter voltage of the bipolar transistor when the current of the first current value is supplied to the bipolar transistor serving as the temperature detection element 303 is written to the feedback capacitor 307b. In the second period, the current of the second current value is supplied to the bipolar transistor, and the emitter voltage of the bipolar transistor changes. The first amplification circuit 310a amplifies the difference between the emitter voltage of the bipolar transistor in the first period and the emitter voltage of the bipolar transistor in the second period and outputs the voltage. According to this method, the temperature detection error derived from the nonlinear current-voltage characteristic of the bipolar transistor can be reduced, as described above.

The reference signal generator 412 can include resistors 301c, 301d, and 301e, switches 309 and 311, a second buffer circuit 302b, and a second amplification circuit 310b. The second buffer circuit 302b can have the same arrangement as the first buffer circuit 302a. The second amplification circuit 310b can have the same arrangement as the first amplification circuit 310a.

The resistors 301c, 301d, and 301e divide the power supply voltage VDD to generate a first voltage V1 and a second voltage V2. In the first period, a control signal P_VL is activated. In the second period, a control signal P_VH is activated. The control signals P_VL and P_VH can be controlled by the timing generator 109. The switch 311 is turned on in accordance with the activation of the control signal P_VL to apply the first voltage V1 to the input terminal of the second buffer circuit 302b. The switch 309 is turned on in accordance with the activation of the control signal P_VH to apply the second voltage V2 to the input terminal of the second buffer circuit 302b. For example, the first voltage V1=1.85 V, and the second voltage V2=1.90 V.

The second buffer circuit 302b can include, for example, a voltage follower circuit or a source follower circuit. FIG. 3 shows an example in which the second buffer circuit 302b is formed by a voltage follower circuit.

The second amplification circuit 310b can include, for example, the differential amplifier 306, the input capacitor 307a, the feedback capacitor 307b, and the reset switch 308. The input capacitor 307a can be arranged between the input terminal of the second amplification circuit 310b and the noninverting input terminal of the differential amplifier 306. The reference voltage VREF can be applied to the inverting input terminal of the differential amplifier 306. The feedback capacitor 307b and the reset switch 308 can be arranged in parallel between the noninverting input terminal of the differential amplifier 306 and the output terminal of the differential amplifier 306. The gain of the second amplification circuit 310b is decided by the ratio of the input capacitor 307a to the feedback capacitor 307b. The gain of the second amplification circuit 310b can be decided such that a voltage within the range of the level of the signal output from the pixel 100 to the signal line VL is output to the sensor circuit 123b. The arrangement of the sensor circuit 123b can thus be made equal to the arrangement of the column circuit 103. The reset switch 308 can be controlled by the reset signal P_TEMP_COR. The reset signal P_TEMP_COR can be controlled by the timing generator 109. When the reset switch 308 is turned on, the second amplification circuit 310b is reset, and a voltage equal to the reference voltage VREF is output from the second amplification circuit 310b (differential amplifier 306).

In the first period, the reset signal P_TEMP_COR is driven from an active state to an inactive state. Accordingly, the first voltage V1 is applied to the second amplification circuit 310b via the second buffer circuit 302b, and the first voltage V1 is written to the feedback capacitor 307b. In the second period, the second voltage V2 is applied to the second amplification circuit 310b via the second buffer circuit 302b. The second amplification circuit 310b amplifies the difference between the first voltage V1 applied to the second amplification circuit 310b in the first period and the second voltage V2 applied to the second amplification circuit 310b in the second period and outputs the voltage.

For example, the base voltage of the bipolar transistor serving as the temperature detection element 303 is 2.6 V, and the emitter voltage is 3.3 V. The first current value that is the current value of the current supplied by the variable current source 305 in the first period is 10 µA, and the second current value that is the current value of the current supplied by the variable current source 305 in the second period is 80 µA. The emitter voltage of the bipolar transistor when the first current value that is the current value of the current supplied by the variable current source 305 in the first period is 10 µA is about 1.85 V. The emitter voltage of the bipolar transistor when the second current value that is the current value of the current supplied by the variable current source 305 in the second period is 80 µA is about 1.90 V. The reference voltage VREF is 2.6 V. The gain of the first amplification circuit 310a and the second amplification circuit 310b is 10.

In place of the reference signal generator 412 as described above, a pad to which a constant voltage is externally applied may be provided. In other words, the reference signal output unit 422 can include not the reference signal generator 412 but a pad to which a constant voltage is externally applied. Alternatively, a band gap reference circuit may be employed as the reference signal generator 412. When a circuit whose output has temperature dependency lower than that of the temperature signal output unit 421 is used as the reference signal output unit 422, a change amount of the temperature signal output unit 421 by the temperature can be obtained using the output of the reference signal output unit 422 as a reference.

In the first embodiment, the temperature signal from the temperature signal generator 411 is input to the horizontal selection circuit 104 via the sensor circuit 123a. In addition, the reference signal from the reference signal generator 412 is input to the horizontal selection circuit 104 via the sensor circuit 123b. The temperature signal and the reference signal are output via the horizontal selection circuit 104 (selection circuit) that selects the signal of the pixel 100.

In the first embodiment, the calculator 20 arranged outside the image capturing apparatus 10 corrects the temperature signal based on the reference signal, thereby obtaining a corrected temperature.

Figure 4:
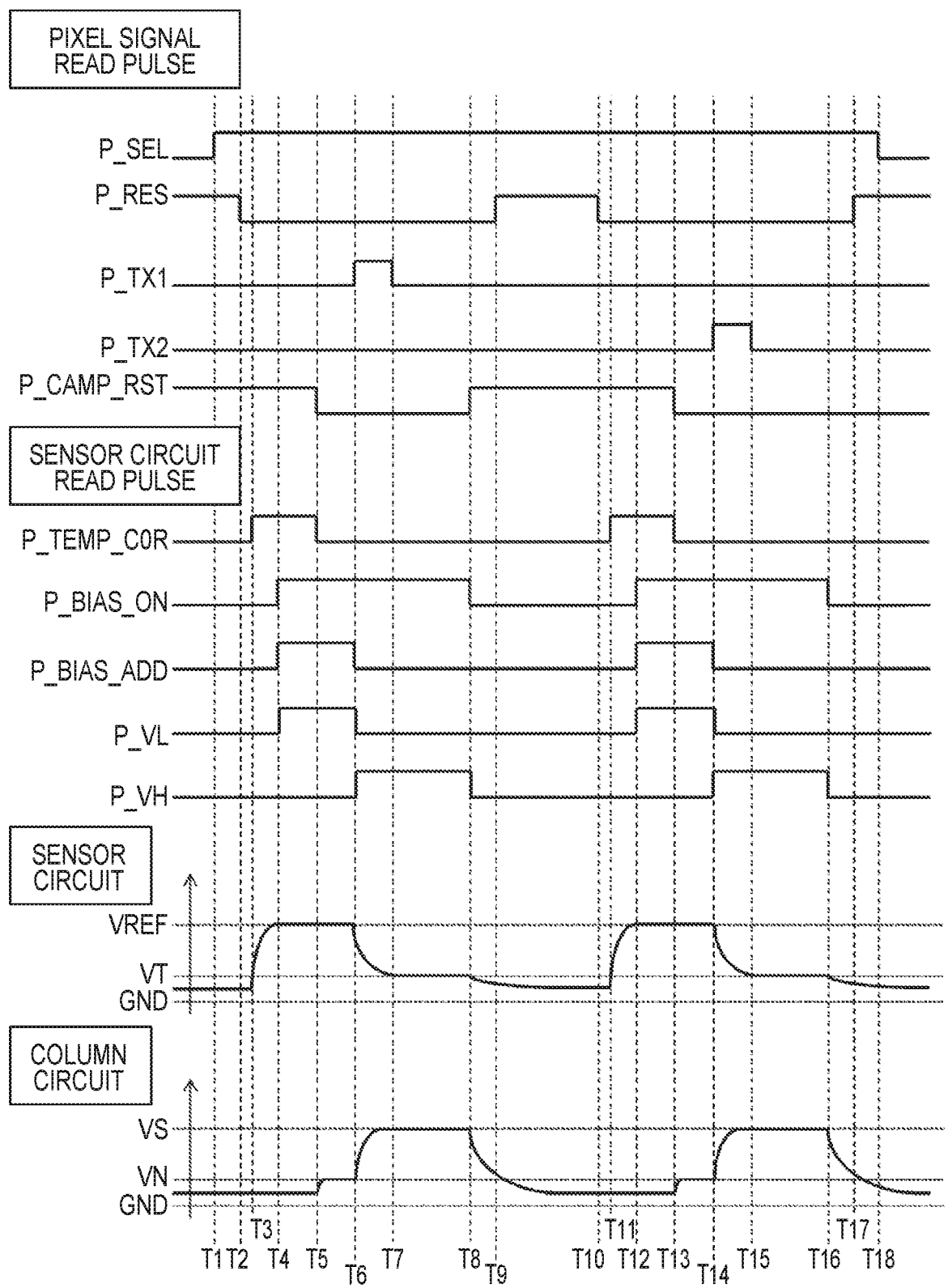
FIG. 4 is a timing chart showing the timing of signal read.

FIG. 4 shows the timings of the pixel signal read from the pixel 100 by the column circuit 103, the temperature signal read from the temperature signal generator 411 by the sensor circuit 123a, and the reference signal read from the reference signal generator 412 by the sensor circuit 123b. At time T1, the vertical selection circuit 102 activates the control signal P_SEL for the pixel 100 of the read target row to high level. At time T2, the vertical selection circuit 102 inactivates the control signal P_RES for the pixel 100 of the read target row to low level, and cancels reset of the charge-voltage converter 203 of the pixel 100 of the read target row.

At time T3, the timing generator 109 activates the control signal P_TEMP_COR to high level, and the first amplification circuit 310a of the temperature signal generator 411 and the second amplification circuit 310b of the reference signal generator 412 are reset. At time T4, the timing generator 109 activates the control signals P_BIAS_ON, P_BIAS_ADD, and P_VL to high level. Accordingly, the current of the first current value flows to the bipolar transistor serving as the temperature detection element 303 of the temperature signal generator 411, and the first voltage V1 is applied to the second buffer circuit 302b of the reference signal generator 412.

At time T5, the timing generator 109 inactivates the control signals P_CAMP_RST and P_TEMP_COR to low level. Accordingly, reset of the column amplifier 350 of the column circuit 103, the first amplification circuit 310a of the temperature signal generator 411, and the second amplification circuit 310b of the reference signal generator 412 is canceled. In the sensor circuit 123a that reads a temperature signal from the temperature signal generator 411, a temperature signal corresponding to the emitter voltage when the first current value is supplied to the temperature detection element 303 (bipolar transistor) is written to the feedback capacitor 307b. In the sensor circuit 123b that reads a reference signal from the reference signal generator 412, the first voltage V1 is written to the feedback capacitor 307b.

The period of times T5 to T6 is the period in which to read the noise signal N. During this period, in the column circuit 103 that reads the pixel signal from the pixel 100, a noise signal VN corresponding to the noise signal N output to the signal line VL can be amplified, A/D-converted by the A/D converter 360, and stored in the storage unit 315. Additionally, in times T5 to T6, in the sensor circuit 123a that reads a temperature signal from the temperature signal generator 411, the temperature signal from the temperature signal generator 411 can be amplified, A/D-converted by the A/D converter 360a, and stored in the storage unit 315a. Also, in times T5 to T6, in the sensor circuit 123b that reads a reference signal from the reference signal generator 412, the reference signal from the reference signal generator 412 can be amplified, A/D-converted by the A/D converter 360b, and stored in the storage unit 315b. Times T4 to T6 correspond to the first period.

In times T6 to T7, the vertical selection circuit 102 activates the control signal P_TX1 for the pixel 100 of the read target row to high level. At time T6, the timing generator 109 inactivates the control signals P_BIAS_ADD and P_VL to low level, and activates the control signal P_VH to high level. Accordingly, in the pixel 100 of the read target row, charge in the photoelectric converter 201-1 is transferred to the charge-voltage converter 203. In the temperature signal generator 411, the current flowing to the temperature detection element 303 (bipolar transistor) changes (in this example, decreases) from the first current value to the second current value. In the reference signal generator 412, the voltage applied to the input terminal of the second buffer circuit 302b changes (in this example, increases) from the first voltage V1 to the second voltage V2.

At time T7, the vertical selection circuit 102 inactivates the control signal P_TX1 for the pixel 100 of the read target row to low level. Transfer of charge in the photoelectric converters 201-1 and 201-2 to the charge-voltage converter 203 thus ends. Times T6 to T8 correspond to the second period.

At time T8, the timing generator 109 activates the control signal P_CAMP_RST to high level, and inactivates the control signals P_BIAS_ON and P_VH to low level. Accordingly, the amplifiers 350a and 350b of the sensor circuits 123a and 123b and the column amplifier 350 of the column circuit 103 are reset.

In times T6 to T8, the first amplification circuit 310a of the temperature signal generator 411 amplifies the difference between the emitter voltage of the bipolar transistor in the first period and the emitter voltage of the bipolar transistor in the second period and outputs the voltage. Additionally, in times T6 to T8, the second amplification circuit 310b amplifies the difference between the first voltage V1 applied to the second amplification circuit 310b in the first period and the second voltage V2 applied to the second amplification circuit 310b in the second period and outputs the voltage.

The period of times T7 to T8 is the period in which to read the optical signal S. During this period, in the column circuit 103 that reads the pixel signal from the pixel 100, an optical signal VS corresponding to the optical signal S output to the signal line VL can be amplified, A/D-converted by the A/D converter 360, and stored in the storage unit 315. Additionally, in times T7 to T8, in the sensor circuit 123a that reads a temperature signal from the temperature signal generator 411, the temperature signal from the temperature signal generator 411 can be amplified, A/D-converted by the A/D converter 360a, and stored in the storage unit 315a. Also, in times T7 to T8, in the sensor circuit 123b that reads a reference signal from the reference signal generator 412, the reference signal from the reference signal generator 412 can be amplified, A/D-converted by the A/D converter 360b, and stored in the storage unit 315b. Times T6 to T8 correspond to the second period.

At time T9, the vertical selection circuit 102 inactivates the control signal P_RES for the pixel 100 of the read target row to low level, and the charge-voltage converter 203 of the pixel 100 of the read target row is reset.

The period of times T10 to T18 is the period in which to read the signal of the photoelectric converter 201-2 of the two photoelectric converters 201-1 and 201-2. During this period of times T10 to T18, reading of the temperature signal from the temperature signal generator 411 and reading of the reference signal from the reference signal generator 412 can also be done.

In the first embodiment, reading of the pixel signal from the pixel 100 by the column circuit 103, reading of the temperature signal from the temperature signal generator 411 by the sensor circuit 123a, and reading of the reference signal from the reference signal generator 412 by the sensor circuit 123b are performed in parallel. However, reading of the pixel signal from the pixel 100 by the column circuit 103, reading of the temperature signal from the temperature signal generator 411 by the sensor circuit 123a, and reading of the reference signal from the reference signal generator 412 by the sensor circuit 123b may be performed independently.

Figure 5:
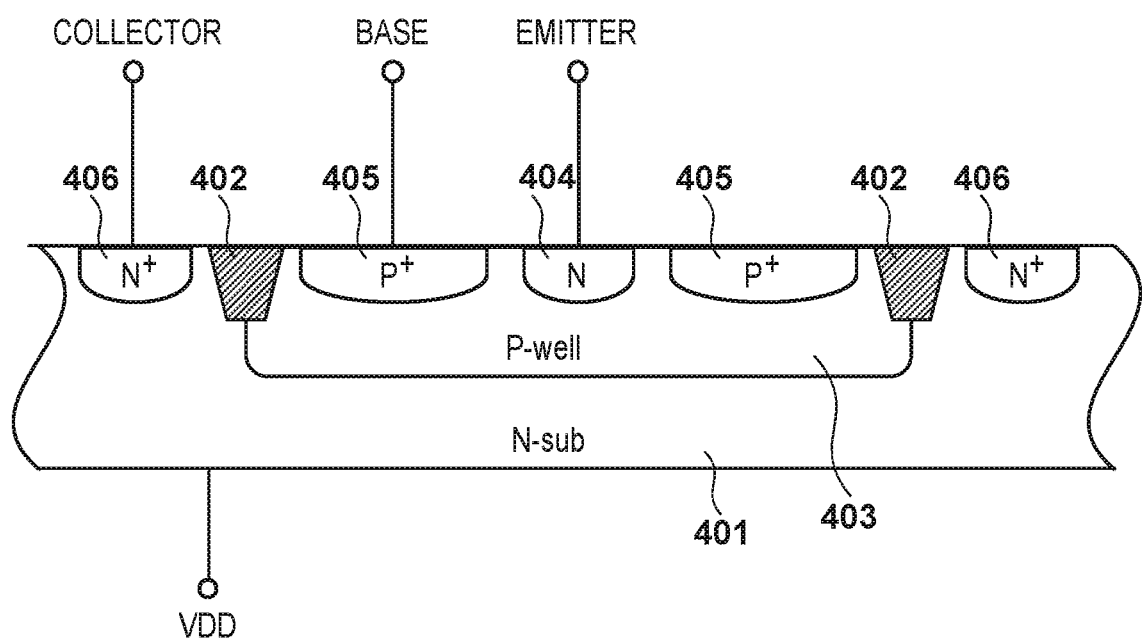
FIG. 5 is a sectional view showing an example of the arrangement of a temperature detection element.

FIG. 5 shows a detailed example of the arrangement of the temperature detection element 303. A substrate 401 corresponds to the substrate SUB in FIG. 1 or a part thereof. In the example shown in FIG. 5, a well 403 formed by a p-type impurity region is provided in the substrate 401 formed by an n-type impurity region. Bases 405 each formed by a heavily doped p-type impurity region and an emitter 404 formed by an n-type impurity region are arranged in the well 403. The bases 405 and the emitter 404 are separated by the p-type impurity region that forms the well 403. Collectors 406 each formed by a heavily doped n-type impurity region are arranged in the substrate 401. An STI is arranged between the bases 405 and the collectors 406. Note that the arrangement shown in FIG. 5 is merely an example, and various arrangements can be employed. In addition, the temperature detection element 303 is not limited to a bipolar transistor and may be formed by another element (for example, a diode or a resistor element).

Figure 6:
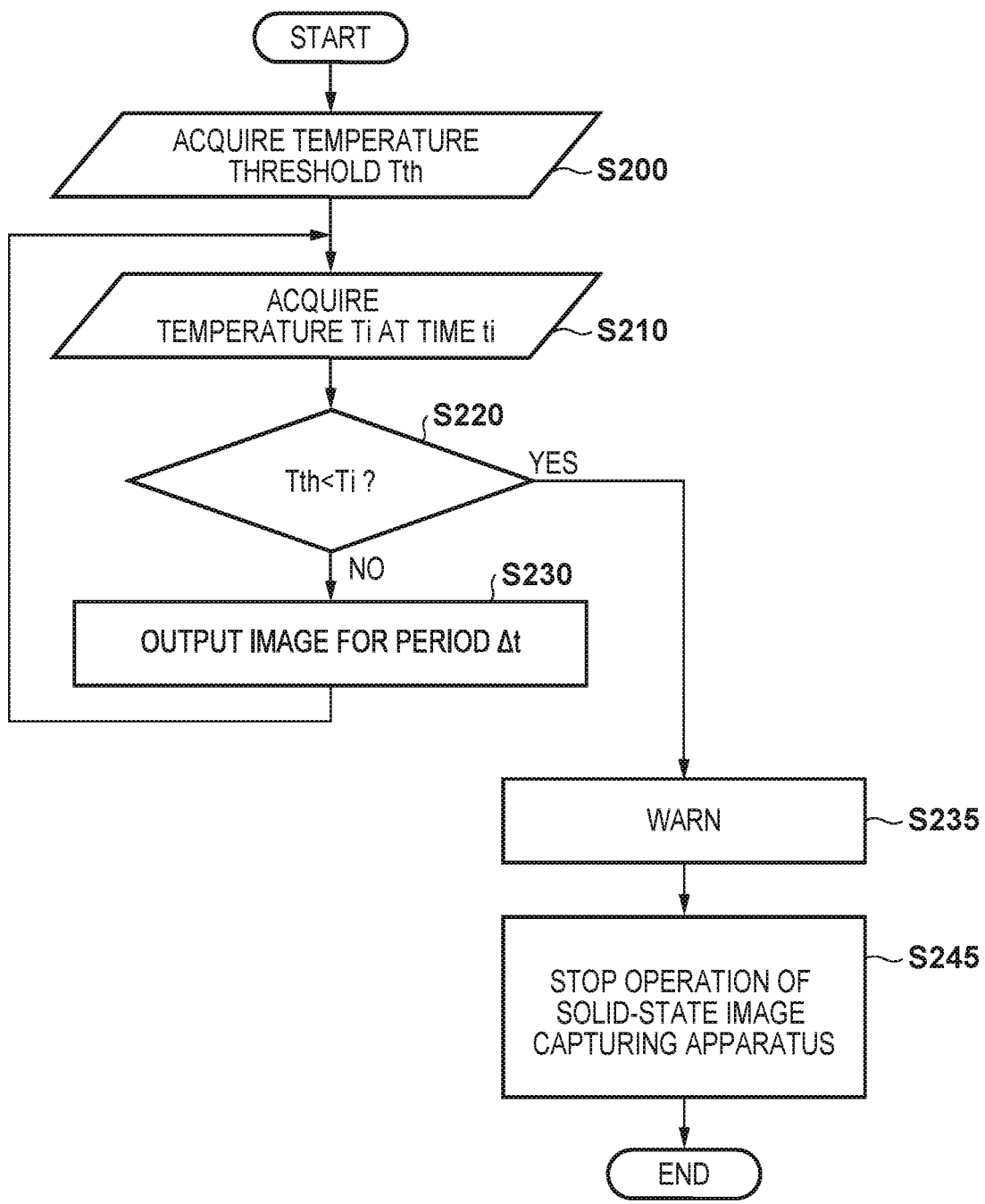
FIG. 6 is a flowchart showing an example of the operation of the image capturing system.

FIG. 6 shows the operation of the image capturing system 30. The operation shown in FIG. 6 can be controlled by the calculator 20. The calculator 20 can be formed by, for example, a PLD (short for Programmable Logic Device) such as an FPGA (short for Field Programmable Gate Array) an ASIC (short for Application Specific Integrated Circuit), a general-purpose computer with a program installed, or a combination of all or some of them.

Under a very high temperature environment, the image capturing apparatus 10 may be unable to normally operate. Hence, an example will be described, in which a threshold is set for use of the image capturing apparatus 10, and if the temperature during use exceeds the threshold, a warning is output, and the image capturing apparatus 10 is stopped because the operation of the image capturing apparatus 10 may be abnormal.

In step S200, the calculator 20 acquires a temperature threshold Tth. The temperature threshold Tth can be acquired from, for example, a nonvolatile memory. The nonvolatile memory may be provided in the calculator 20 or outside the calculator 20.

In step S210, the calculator 20 obtains a corrected temperature Ti according to equation (1) based on the temperature signal and the reference signal output from the image capturing apparatus 10 (signal processing circuit 105). In other words, the calculator 20 can obtain the corrected temperature Ti by obtaining the ratio of the temperature signal to the reference signal, as described above.

In step S220, the calculator 20 compares the temperature Ti with the temperature threshold Tth. If the temperature Ti is equal to or lower than the threshold temperature Tth, in step S230, the calculator 20 causes the image capturing apparatus 10 to output an image signal for a period Δt, and after that, returns to step S210. On the other hand, if the temperature Ti is higher than the threshold temperature Tth, the calculator 20 outputs a warning in step S235, and stops the operation of the image capturing apparatus 10 in step S245. The stop of the operation of the image capturing apparatus 10 is, for example, the stop of supply of the power supply voltage to the image capturing apparatus 10 or the stop of the image capturing operation.

The processing shown in FIG. 5 can be started simultaneously with the start of the operation of the image capturing apparatus 10. Alternatively, the processing shown in FIG. 5 may be activated by another apparatus. If the image capturing system 30 includes an output unit such as a display unit and/or a speaker, the warning output of step S235 can be done by driving the output unit. The warning output of step S235 may be done for a control unit or an output unit provided in a host system including the image capturing system 30. If the image capturing system 30 is mounted on a movable apparatus such as an automobile, a warning can be output from an output unit provided in the movable apparatus based on the warning output from the image capturing system 30.

In the example shown in FIG. 5, the operation of the image capturing apparatus 10 is stopped after the output of the warning. However, even if the warning is output, the operation of the image capturing apparatus 10 need not always be stopped. Alternatively, when the temperature Ti exceeds the temperature threshold Tth, the operation of the image capturing apparatus 10 may be stopped, and after that, a warning may be output.

Figure 7:
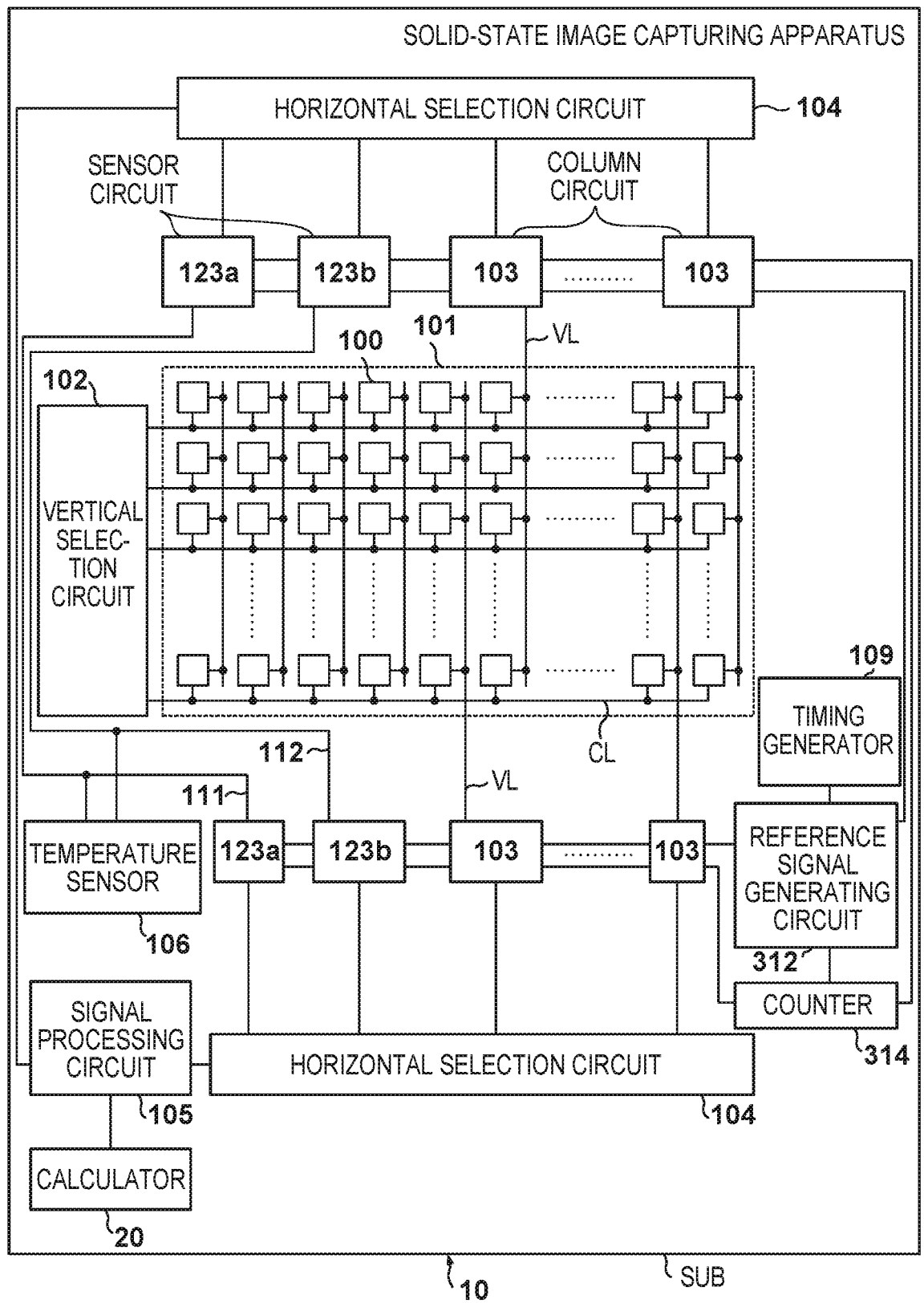
FIG. 7 is a block diagram showing the arrangement of an image capturing apparatus according to the second embodiment.

FIG. 7 shows the arrangement of an image capturing apparatus 10 according to the second embodiment of the present invention. Matters that are not mentioned as the second embodiment comply with the first embodiment. In this second embodiment, a calculator 20 is incorporated in the image capturing apparatus 10.

Figure 8:
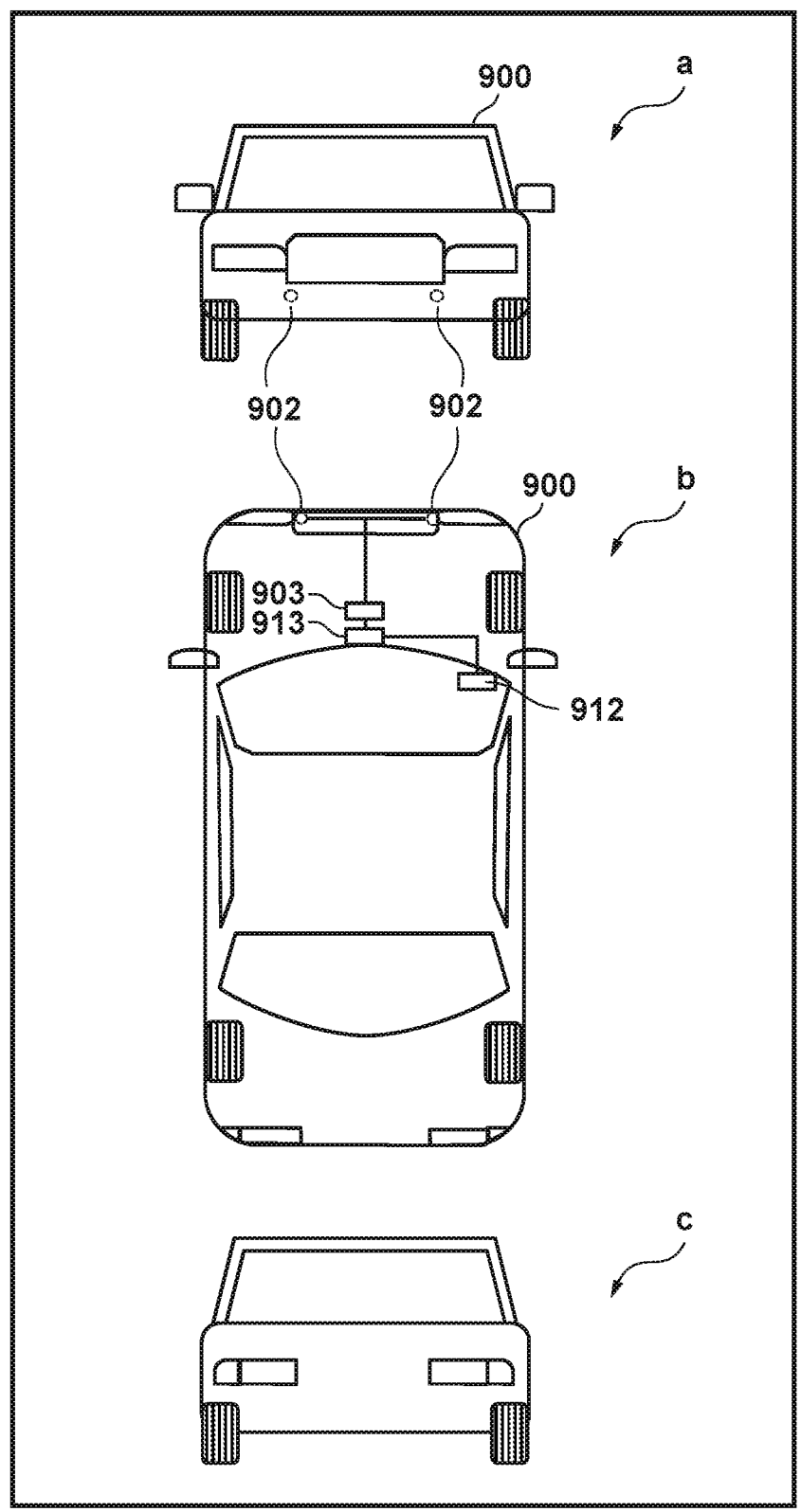
FIG. 8 is a view showing an example of the arrangement of a movable apparatus.

FIG. 8 shows the arrangement of an automobile 900 as an example of a movable apparatus incorporating the image capturing system 30 according to the first embodiment or the image capturing apparatus 10 according to the second embodiment. In FIG. 8, (a) schematically shows the automobile 900 viewed from the front side; (b), the automobile 900 viewed from above; and (c), the automobile 900 viewed from the rear side. The automobile 900 includes an image capturing apparatus 902 corresponding to the image capturing system 30 according to the first embodiment or the image capturing apparatus 10 according to the second embodiment. The automobile 900 also includes an ASIC (Application Specific Integrated Circuit) 903, a warning device 912, and a main control unit 913.

Upon receiving a signal representing an abnormality from the image capturing apparatus 902, a vehicle sensor, a control unit, or the like, the warning device 912 gives a warning to the driver. The main control unit 913 generally controls the operations of the image capturing apparatus 902, the vehicle sensor, the control unit, and the like. Note that the automobile 900 need not always include the main control unit 913. In this case, the image capturing apparatus 902, the vehicle sensor, or the control unit transmits/receives a control signal via a communication network (for example, CAN standard).

Figure 9:
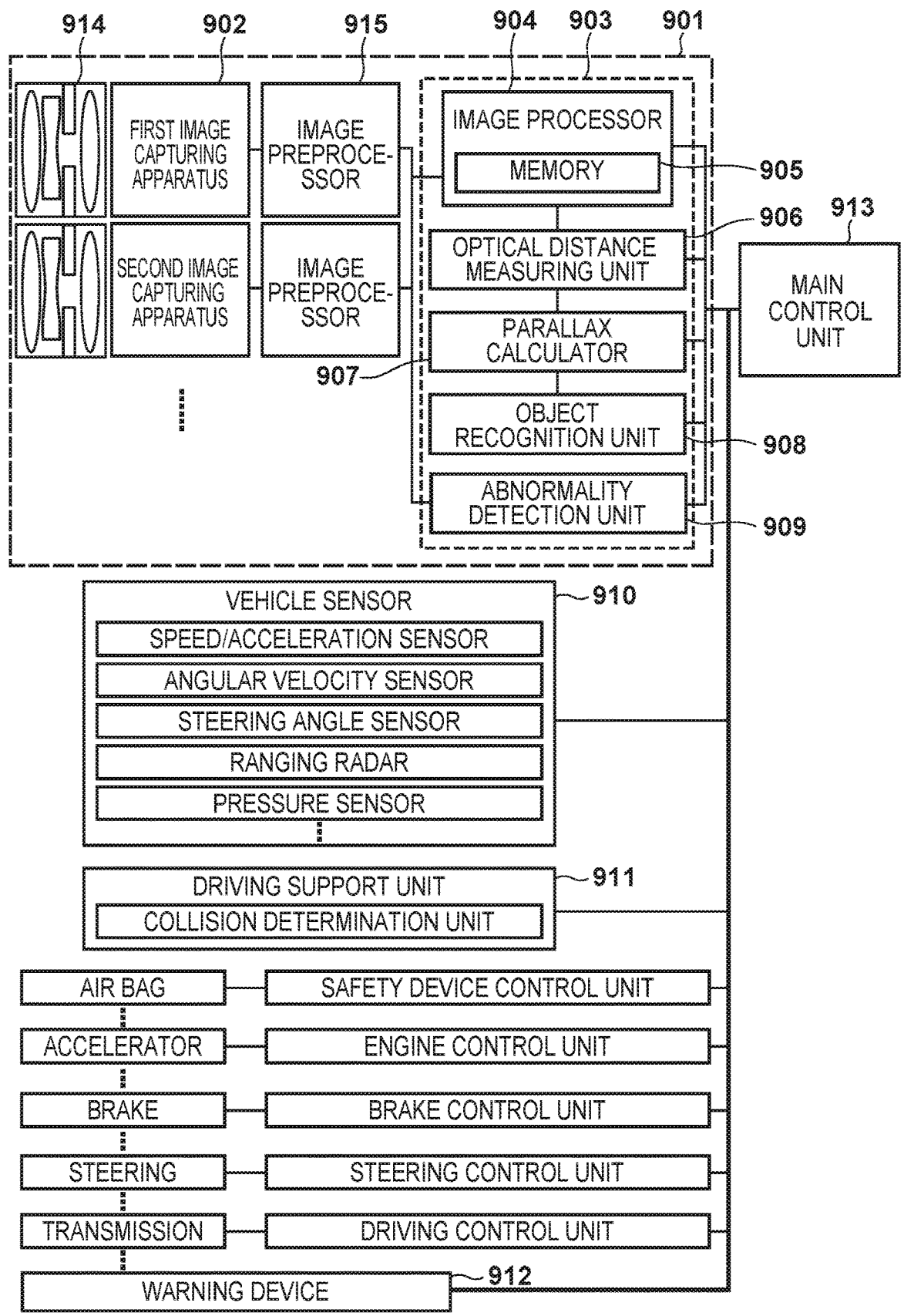
FIG. 9 is a block diagram showing the system arrangement of the movable apparatus.

FIG. 9 is a block diagram showing the system arrangement of the automobile 900. The automobile 900 includes the first image capturing apparatus 902 and the second image capturing apparatus 902. A stereo camera is formed by the first image capturing apparatus 902 and the second image capturing apparatus 902. An object image is formed on the image capturing apparatus 902 by an optical unit 914. A pixel signal output from the image capturing apparatus 902 is processed by an image preprocessor 915 and transmitted to the ASIC 903. The image preprocessor 915 performs calculation of obtaining the difference between the optical signal VS and the noise signal VN or processing such as synchronization signal addition.

The ASIC 903 can include an image processor 904, an optical distance measuring unit 906, a parallax calculator 907, an object recognition unit 908, and an abnormality detection unit 909. The image processor 904 processes the pixel signal to generate an image signal. The image processor 904 also performs correction of an image signal or defect compensation. The image processor 904 includes a memory 905 that temporarily holds the image signal. The memory 905 may store the position of a known defective pixel of the image capturing apparatus 902. The above-described calculator 20 may be provided in the image processor 904.

The optical distance measuring unit 906 performs focusing or distance measurement of the object using the image signal. The parallax calculator 907 performs object collation (stereo matching) of a parallax image. The object recognition unit 908 analyzes the image signal and recognizes objects such as an automobile, a person, a signpost, and a road.

The abnormality detection unit 909 detects a fault or an operation error of the image capturing apparatus 902. Upon detecting a fault or an operation error, the abnormality detection unit 909 sends a signal representing detection of the abnormality to the main control unit 913. The abnormality detection unit 909 may have the function of the above-described calculator 20.

The automobile 900 includes a vehicle sensor 910 and a driving support unit 911. The vehicle sensor 910 can include a speed/acceleration sensor, an angular velocity sensor, a steering angle sensor, a ranging radar, and a pressure sensor.

The driving support unit 911 includes a collision determination unit. The collision determination unit determines, based on pieces of information from the optical distance measuring unit 906, the parallax calculator 907, and the object recognition unit 908, whether there is possibility of collision against an object. The optical distance measuring unit 906 and the parallax calculator 907 are examples of a distance information acquisition means for acquiring information of a distance to a target. That is, the distance information is information about a parallax, a defocus amount, and a distance up to the target. The collision determination unit may determine the collision possibility using one of these pieces of distance information. The distance information acquisition means may be implemented by hardware designed for a special purpose or may be implemented by a software module.

An example in which the driving support unit 911 controls the automobile 900 so it does not collide against another object has been described. However, it is also applicable to control of automatic driving following another vehicle or control of automatic driving not to drive off a lane.

The automobile 900 also includes driving units used for driving such as an air bag, an accelerator, a brake, a steering, and a transmission. The automobile 900 also includes control units for these units. Each control unit controls a corresponding driving unit based on a control signal of the main control unit 913.

When performing driving support or automatic driving by mounting, in the automobile 900, the image capturing apparatus or the image capturing system according to the present invention, as described above, a plurality of image capturing apparatuses or image capturing systems can be used. At this time, if the characteristic of an element in the temperature signal output unit changes between the image capturing apparatuses or image capturing systems, an assumed temperature changes between the image capturing apparatuses, and it may be impossible to normally perform driving support or automatic driving. In addition, since driving support or automatic driving of the automobile 900 requires correctness, the accuracy required for temperature measurement is also high.

When the image capturing apparatus or image capturing system according to the present invention is used, the accuracy of temperature measurement can be improved, and the correctness of driving support or automatic driving can be increased.

The image capturing system used in the embodiments is applicable not only to an automobile but also to, for example, a movable apparatus such as ship, an airplane, or an industrial robot. The image capturing system is also applicable not only to a movable apparatus but also widely to a device using object recognition such as an ITS (Intelligent Transportation System).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194774, filed Sep. 30, 2016, which is hereby incorporated by reference herein in its entirety.

What is claimed is:

1. An image capturing apparatus comprising:
   a plurality of pixels arranged on a substrate;
   a temperature signal output unit arranged on the substrate and configured to output a temperature signal, the temperature signal output unit including a first A/D converter configured to generate the temperature signal by AD-converting an output signal from a temperature sensor; and
   a reference signal output unit arranged on the substrate and configured to output a reference signal, the reference signal output unit including a second A/D converter configured to generate the reference signal by AD-converting an analog reference signal,
   wherein a temperature dependency of the reference signal is lower than a temperature dependency of the temperature signal, and the temperature signal output unit and the reference signal output unit are arranged in regions different from each other on the substrate.

2. The apparatus according to claim 1, further comprising a selection circuit configured to receive signals including the temperature signal output from the temperature output unit and the reference signal output from the reference signal output unit, and output a signal corresponding to a signal selected from the received signals.

3. The apparatus according to claim 1, further comprising a signal generator configured to generate a common signal to be supplied to the temperature signal output unit and the reference signal output unit.

4. The apparatus according to claim 1, further comprising a calculator configured to obtain a corrected temperature based on a ratio of the temperature signal to the reference signal.

5. The apparatus according to claim 1, further comprising a calculator configured to obtain a corrected temperature based on a difference between the temperature signal and the reference signal.

6. The apparatus according to claim 1, wherein the reference signal output unit is configured to output, as the reference signal, a voltage according to a voltage that is input to a pad.

7. The apparatus according to claim 1, wherein the reference signal output unit includes a band gap reference circuit.

8. The apparatus according to claim 7, wherein the temperature signal output unit further includes a first amplification circuit configured to output the analog temperature signal, and the reference signal output unit further includes a second amplification circuit configured to output the analog reference signal, the second amplification circuit having an arrangement same as that of the first amplification circuit.

9. The apparatus according to claim 1, further comprising a plurality of column amplifiers configured to amplify signals from a plurality of columns formed by the plurality of pixels,
   wherein the temperature signal output unit includes a first amplifier,
   the reference signal output unit includes a second amplifier, and
   the plurality of column amplifiers, the first amplifier and the second amplifier have same arrangement.

10. The apparatus according to claim 1, wherein
   the temperature signal output unit further includes a temperature signal generator configured to generate the analog temperature signal, and
   the reference signal output unit further includes a reference signal generator configured to generate the analog reference signal.

11. The apparatus according to claim 10, wherein a common reference signal is supplied to the first sensor circuit and the second sensor circuit.

12. A movable apparatus comprising:
   an image capturing apparatus of claim 1; and
   an integrated circuit configured to process a signal output from the image capturing apparatus.

13. An image capturing apparatus comprising:
   a plurality of pixels arranged on a substrate;
   a temperature signal output circuit arranged on the substrate and configured to output a temperature signal;
   a reference signal output circuit arranged on the substrate and configured to output a reference signal; and
   a selection circuit configured to receive signals including the temperature signal output from the temperature signal output circuit and the reference signal output from the reference signal output circuit and output a signal corresponding to a signal selected from the received signals,
   wherein the temperature signal output circuit and the reference signal output circuit are arranged in regions different from each other on the substrate, and
   a temperature dependency of the reference signal is lower than a temperature dependency of the temperature signal.

14. The apparatus according to claim 13, further comprising a signal generator configured to generate a common signal to be supplied to the temperature signal output circuit and the reference signal output circuit.

15. The apparatus according to claim 13, further comprising a calculator configured to obtain a corrected temperature based on a ratio of the temperature signal to the reference signal.

16. The apparatus according to claim 13, further comprising a calculator configured to obtain a corrected temperature based on a difference between the temperature signal and the reference signal.

17. The apparatus according to claim 13, wherein the reference signal output circuit is configured to output, as the reference signal, a voltage according to a voltage that is input to a pad.

18. The apparatus according to claim 13, wherein the reference signal output circuit includes a band gap reference circuit.

19. The apparatus according to claim 13, further comprising a plurality of column amplifiers configured to amplify signals from a plurality of columns formed by the plurality of pixels,
wherein the temperature signal output circuit includes a first amplifier,
the reference signal output circuit includes a second amplifier, and
the plurality of column amplifiers, the first amplifier and the second amplifier have a same arrangement.

20. The apparatus according to claim 13, wherein
the temperature signal output circuit includes a temperature signal generator configured to generate a first temperature signal, and a first sensor circuit configured to output the first temperature signal, and
the reference signal output circuit includes a reference signal generator configured to generate a first reference signal, and a second sensor circuit configured to output the first reference signal.

21. The apparatus according to claim 20, wherein a common reference signal is supplied to the first sensor circuit and the second sensor circuit.

22. The apparatus according to claim 20, wherein each of the first sensor circuit and the second sensor circuit includes an A/D converter.

23. A movable apparatus comprising:
an image capturing apparatus of claim 13; and
an integrated circuit configured to process a signal output from the image capturing apparatus.

24. An image capturing system comprising:
an image preprocessor configured to process a signal output from an image capturing apparatus and generate an image signal; and
a calculator configured to receive a temperature signal output from the image capturing apparatus and a reference signal output from the image capturing apparatus, and correct the temperature signal based on the reference signal to obtain a corrected temperature.

25. The system according to claim 24, wherein temperature dependency of the reference signal is lower than a temperature dependency of the temperature signal.

26. The system according to claim 24, wherein the calculator obtains the corrected temperature based on a ratio of the temperature signal to the reference signal.

27. The system according to claim 24, wherein the calculator obtains the corrected temperature based on a difference between the temperature signal and the reference signal.

28. The system according to claim 24, further comprising a controller configured to stop an operation of the image capturing apparatus based on the corrected temperature.

29. The system according to claim 24, further comprising a controller configured to output a warning based on the corrected temperature.

30. The system according to claim 24, wherein the calculator is configured to perform a comparison between the corrected temperature and a threshold temperature.

31. A movable apparatus comprising:
an image capturing system of claim 24; and
an integrated circuit configured to process a signal output from the image capturing system.

* * * * *